(12) United States Patent
Wang et al.

(10) Patent No.: US 10,367,542 B2
(45) Date of Patent: Jul. 30, 2019

(54) SELF-INTERFERENCE SIGNAL CANCELLATION DEVICE AND METHOD

(71) Applicant: Southwest Electronics Technology Research Institute (China Electronics Technology Group Corporation, Chengdu, Sichuan (CN)

(72) Inventors: Kan Wang, Sichuan (CN); Guangping Cao, Sichuan (CN); Jianshe Nan, Sichuan (CN); Tuo Yang, Sichuan (CN)

(73) Assignee: SOUTHWEST ELECTRONICS TECHNOLOGY RESEARCH INSTITUTE (CHINA ELECTRONICS TECHNOLOGY GROUP CORPORATION NO. 10 RESEARCH INSTITUTE), Chengdu, Sichuan (CN)

( * ) Notice: Subject to any disclaimer, the term of this patent is extended or adjusted under 35 U.S.C. 154(b) by 0 days.

(21) Appl. No.: 15/782,189

(22) Filed: Oct. 12, 2017

(65) Prior Publication Data

US 2019/0052304 A1 Feb. 14, 2019

(30) Foreign Application Priority Data

Aug. 11, 2017 (CN) .......................... 2017 1 0687665

(51) Int. Cl.
*H04B 1/525* (2015.01)
*H04B 1/12* (2006.01)
*H04B 15/02* (2006.01)

(52) U.S. Cl.
CPC ............ *H04B 1/525* (2013.01); *H04B 1/123* (2013.01); *H04B 15/02* (2013.01)

(58) Field of Classification Search
CPC ......... H04B 1/525; H04B 1/123; H04B 15/02
See application file for complete search history.

(56) References Cited

U.S. PATENT DOCUMENTS

2012/0321012 A1* 12/2012 Elenes ................. H04B 7/0845
375/285
2015/0318976 A1* 11/2015 Eltawil ................. H04B 1/123
370/278

(Continued)

*Primary Examiner* — Chi H Pham
*Assistant Examiner* — Weibin Huang
(74) *Attorney, Agent, or Firm* — Birch, Stewart, Kolasch & Birch, LLP

(57) ABSTRACT

A self-interference signal cancellation device and method are disclosed. A power divider divides a signal source into two paths, with one being connected to a transmit antenna and the other being connected to an input end of a self-interference signal reconstruction circuit. An output end of the self-interference signal reconstruction circuit is connected to a first input end of a combiner. An output end of a receive antenna is connected to a second input end of the combiner and a feedback regulating end of the self-interference signal reconstruction circuit, respectively. The transmit antenna and the receive antenna are arranged at different positions. According to the self-interference signal cancellation device of the present invention, by means of polarization isolation and separate arrangement between the transmit antenna and the receive antenna, high isolation between the antennas can be achieved, thereby reducing requirements for simulation elimination.

7 Claims, 2 Drawing Sheets

(56) References Cited

U.S. PATENT DOCUMENTS

| | | | |
|---|---|---|---|
| 2015/0341157 A1* | 11/2015 | Eltawil | H04L 5/1453 370/278 |
| 2017/0005773 A1* | 1/2017 | Liu | H04B 1/525 |
| 2017/0041060 A1* | 2/2017 | Kim | H04B 15/02 |
| 2018/0131502 A1* | 5/2018 | Askar | H04B 1/1027 |

* cited by examiner

SELF-INTERFERENCE SIGNAL CANCELLATION DEVICE AND METHOD

This application claims priority to Chinese application number 201710687665.8, filed Aug. 11, 2017, with a title of SELF-INTERFERENCE SIGNAL CANCELLATION DEVICE AND METHOD. The above-mentioned patent application is incorporated herein by reference in its entirety.

TECHNICAL FIELD

The present invention relates to the wireless communication filed, and in particular, to a self-interference signal cancellation device and method.

BACKGROUND

With continuous development of the mobile communication technologies, data services are growing exponentially, while such rapid data growth brings tremendous pressure to an entire wireless access network, so that the wireless network system capacity and spectrum efficiency need to be improved urgently. All existing full-duplex self-interference cancellation devices are designed for a base station that imposes higher performance requirements thereon. Therefore, such devices featuring an overlarge circuit scale, excessively high costs, and an overlarge volume are not applicable to small equipment of mobile terminals.

SUMMARY

The purpose of the present invention is to provide a self-interference signal cancellation device and method for resolving the problem that an existing self-interference cancellation device has a large volume and high costs.

To achieve the above purpose, the present invention provides the following solutions.

The present invention provides a self-interference signal cancellation device, including a power divider, a self-interference signal reconstruction circuit, a combiner, a transmit antenna, and a receive antenna, wherein, a signal source is divided into two paths after passing through the power divider, with one being connected to the transmit antenna and the other being connected to an input end of the self-interference signal reconstruction circuit; an output end of the self-interference signal reconstruction circuit is connected to a first input end of the combiner; an output end of the receive antenna is connected to a second input end of the combiner and a feedback regulating end of the self-interference signal reconstruction circuit, respectively; and the transmit antenna and the receive antenna are arranged at different positions.

Optionally, the self-interference signal reconstruction circuit includes an attenuator, a phase shifter, and an adaptive power phase controller, wherein an input end of the attenuator is connected to the power divider; an output end of the attenuator is connected to an input end of the phase shifter; an output end of the phase shifter is connected to an input end of the combiner and a first input end of the adaptive power phase controller, respectively; the output end of the receive antenna is connected to a second input end of the adaptive power phase controller; an output end of the combiner is connected to a third input end of the adaptive power phase controller; a first output end of the adaptive power phase controller is connected to a feedback regulating end of the phase shifter; and a second output end of the adaptive power phase controller is connected to a feedback regulating end of the attenuator.

Optionally, the cancellation device further includes a first radio frequency switch, wherein an input end of the first radio frequency switch is connected to the output end of the phase shifter; a first output end of the first radio frequency switch is connected to the input end of the combiner; and a second output end of the first radio frequency switch is connected to the first input end of the adaptive power phase controller.

Optionally, the cancellation device further includes a second radio frequency switch, wherein an input end of the second radio frequency switch is connected to the output end of the receive antenna; a first output end of the second radio frequency switch is connected to the input end of the combiner; and a second output end of the second radio frequency switch is connected to the second input end of the adaptive power phase controller.

Optionally, the cancellation device further includes a third radio frequency switch, wherein an input end of the third radio frequency switch is connected to the output end of the combiner; a first output end of the third radio frequency switch is an output end of the cancellation device; and a second output end of the third radio frequency switch is connected to the third input end of the adaptive power phase controller.

Optionally, a distance from a position of the transmit antenna to a position of the receive antenna is greater than 8 cm.

Optionally, the transmit antenna and the receive antenna have different polarization modes.

The present invention further provides a self-interference signal cancellation method, including steps of dividing a signal of a signal source into a transmit signal and a cancellation signal, and transmitting the transmit signal; acquiring a receive signal; regulating power and phase of the cancellation signal according to the receive signal, to obtain a reconstruction signal; and calculating a difference between the receive signal and the reconstruction signal.

Optionally, the step of regulating power and phase of the cancellation signal according to the receive signal specifically includes steps of calculating a power difference between the receive signal and the cancellation signal; regulating the cancellation signal according to the power difference to make the cancellation signal and the receive signal have the same power, to obtain a first output signal; adding the receive signal and the first output signal, to obtain output signal power; calculating a difference between the output signal power and a preset value, to obtain a calculation result; and regulating a power control signal according to the calculation result, to make phase of the power control signal opposite to phase of the receive signal.

According to specific embodiments provided in the present invention, the present invention discloses the following technical effects:

According to the self-interference signal cancellation device provided in the present invention, by means of separate arrangement and polarization isolation between the transmit antenna and the receive antenna, high isolation between the antennas can be achieved, thereby reducing requirements for simulation elimination. In this way, only a one-way attenuator and a phase shifter are required to complete elimination of a self-interference signal, and therefore the circuit structure can be simple. In addition, a circulator is replaced with the transmit antenna and the receive antenna, thereby reducing the size of the entire device and costs, so that the device can be widely used in mobile communication terminals.

BRIEF DESCRIPTION OF THE DRAWING

To describe the technical solutions in the embodiments of the present invention or in the prior art more clearly, drawings referred to in the embodiments of the present invention will now be described below briefly. Apparently, the drawings in the following description depict only some embodiments of the present invention, and those skilled in the art may also derive other drawings from these drawings without creative efforts.

DETAILED DESCRIPTION

The technical solutions in embodiments of the present invention will be described below clearly and completely with reference to the drawings referred to in the embodiments. Apparently, the described embodiments are merely a part but not all of the embodiments of the present invention. All other embodiments obtained by those skilled in the art based on the embodiments of the present invention without any creative effort shall fall within the protection scope of the present invention.

The purpose of the present invention is to provide a self-interference signal cancellation device and method for resolving the problem that an existing self-interference cancellation device has a large volume and high costs.

To make the objectives, features, and advantages of the present invention more apparent, the present invention will be further described below in detail in conjunction with the accompanying drawings and the embodiments.

Embodiment 1

Figure 1:
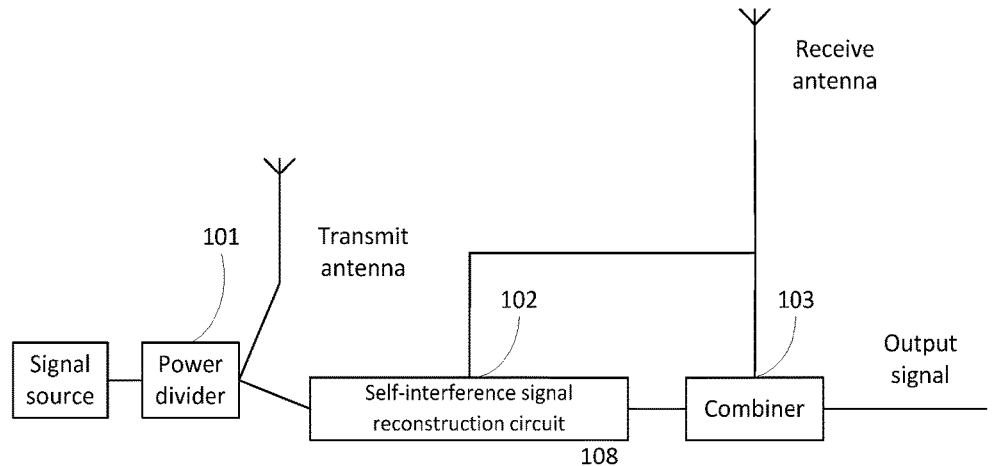
FIG. 1 shows a connection structure of Embodiment 1 of a self-interference signal cancellation device according to the present invention.

FIG. 1 shows a connection structure of Embodiment 1 of a self-interference signal cancellation device according to the present invention. As shown in FIG. 1, the self-interference signal cancellation device includes a power divider 101, a self-interference signal reconstruction circuit 102, a combiner 103, a transmit antenna, and a receive antenna.

A signal source is divided into two paths after passing through the power divider 101, with one being connected to the transmit antenna and the other being connected to an input end of the self-interference signal reconstruction circuit 102. An output end of the self-interference signal reconstruction circuit 102 is connected to a first input end of the combiner 103. An output end of the receive antenna is connected to a second input end of the combiner 103 and a feedback regulating end of the self-interference signal reconstruction circuit 102, respectively. The transmit antenna and the receive antenna are arranged at different positions.

Optionally, a distance from a position of the transmit antenna to a position of the receive antenna is greater than 8 cm.

Optionally, the transmit antenna and the receive antenna have different polarization modes. For example, the transmit antenna uses a +45 degree polarization mode, and the receive antenna uses a −45 degree polarization mode, so as to achieve polarization isolation between the transmit antenna and the receive antenna, and minimize a transmit signal received by the receive antenna.

This embodiment utilizes long-distance polarization isolation between the transmit and receive antennas, so that inter-antenna self-interference signal isolation can reach 30 db. Since a terminal does not use a 3D MIMO technology, a manner of long-distance physical shielding plus polarization isolation may be used to make the isolation increase from a usual 15 db achieved by a circulator to 30 db, 15 db higher than the isolation achieved by the circulator.

According to the self-interference signal cancellation device provided in this embodiment, by means of separate arrangement and polarization isolation between the transmit antenna and the receive antenna, high isolation between the antennas can be achieved, thereby reducing requirements for simulation elimination. In this way, only a self-interference signal reconstruction circuit is required to complete elimination of a self-interference signal, and therefore the circuit structure can be simple. In addition, a circulator is replaced with the transmit antenna and the receive antenna, thereby reducing a size of the entire device and costs, so that the device can be widely used in mobile communication terminals.

Embodiment 2

Figure 2:
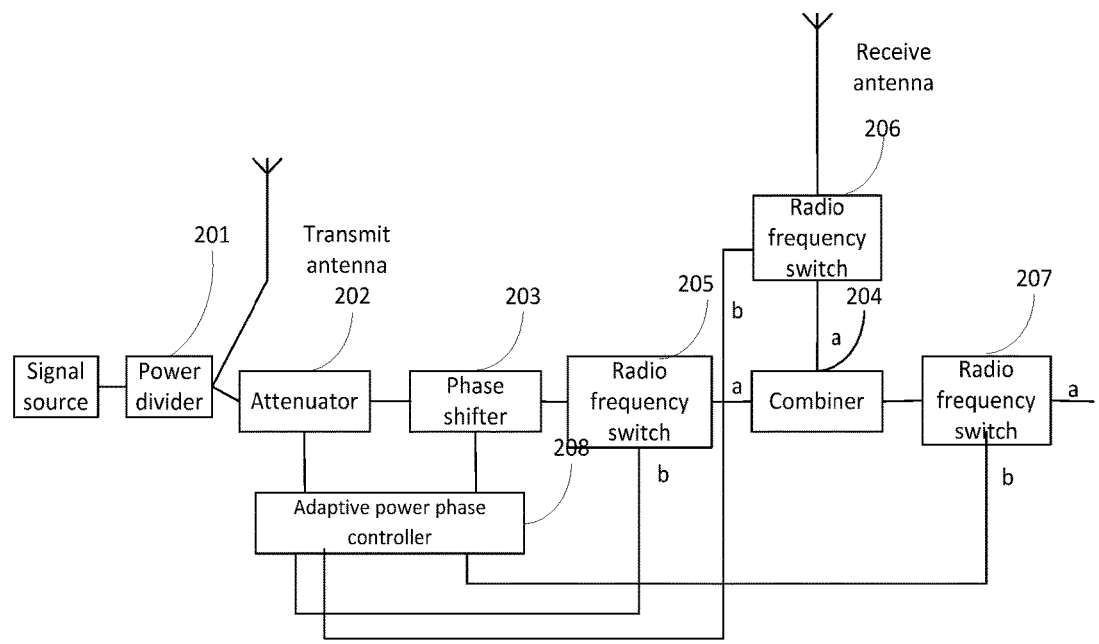
FIG. 2 shows a connection structure of Embodiment 2 of a self-interference signal cancellation device according to the present invention.

FIG. 2 shows a connection structure of Embodiment 2 of a self-interference signal cancellation device according to the present invention. As shown in FIG. 2, the self-interference signal cancellation device includes a power divider 201, an attenuator 202, a phase shifter 203, an adaptive power phase controller 208, a combiner 204, a radio frequency switch 205, a radio frequency switch 206, a radio frequency switch 207, a transmit antenna, and a receive antenna.

A signal source is divided into two paths after passing through the power divider 201, with one being connected to the transmit antenna and the other being connected to an input end of the attenuator 202; and an output end of the attenuator 202 is connected to an input end of the phase shifter 203. Because of high isolation between the antennas, requirements for simulation elimination on the device may be lowered, and a relatively simple device may be used. A one-way attenuator and a phase shifter are used herein to regulate amplitude and phase of a cancellation signal, and an amount of cancellation of 35 db in a simulation domain can be achieved.

An output end of the phase shifter 203 is connected to an input end of the radio frequency switch 205; an output end a of the radio frequency switch 205 is connected to a first input end of the combiner 204; and an output end b of the radio frequency switch 205 is connected to a first input end of the adaptive power phase controller 208.

The receive antenna is connected to an input end of the radio frequency switch 206; an output end a of the radio frequency switch 206 is connected to a second input end of the combiner 204; and an output end b of the radio frequency switch 206 is connected to a second input end of the adaptive power phase controller 208.

An output end of the combiner 204 is connected to an input end of the radio frequency switch 207; an output end a of the radio frequency switch 207 is an output end of the cancellation device; and an output end b of the radio frequency switch 207 is connected to a third input end of the adaptive power phase controller 208.

Compared with a traditional coupler, a radio frequency switch is used to control a signal flow so as to achieve power collection, so that signal attenuation is much lower and collected values are more accurate.

A first output end of the adaptive power phase controller 208 is connected to a feedback regulating end of the phase shifter 203; and a second output end of the adaptive power phase controller 208 is connected to a feedback regulating end of the attenuator 202.

Optionally, a distance from a position of the transmit antenna to a position of the receive antenna is greater than 8 cm.

Optionally, the transmit antenna and the receive antenna have different polarization modes. For example, the transmit antenna uses a +45 degree polarization mode, and the receive antenna uses a −45 degree polarization mode, so as to achieve a polarization isolation between the transmit antenna and the receive antenna, and minimize a transmit signal received by the receive antenna.

This embodiment utilizes a long-distance polarization isolation between the transmit and receive antennas, so that inter-antenna self-interference signal isolation can reach 30 db. Since a terminal does not use a 3D MIMO technology, a manner of long-distance physical shielding plus polarization isolation may be used to make the isolation increase from a usual 15 db achieved by a circulator to 30 db, 15 db higher than the isolation achieved by the circulator.

According to the self-interference signal cancellation device provided in this embodiment, by means of separate arrangement and polarization isolation between the transmit antenna and the receive antenna, high isolation between the antennas can be achieved, thereby reducing requirements for simulation elimination. In this way, only a one-way attenuator and a phase shifter are required to complete elimination of a self-interference signal, and therefore the circuit structure can be simple. In addition, a circulator is replaced with a transmit antenna and a receive antenna, thereby reducing a size of the entire device and costs, so that the device can be widely used in mobile communication terminals.

Figure 3:
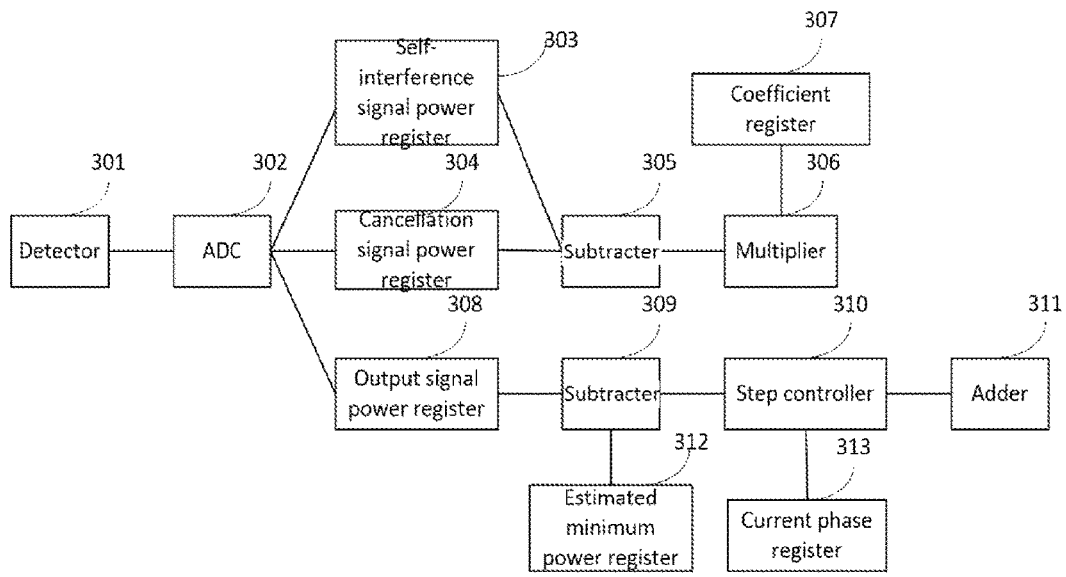
FIG. 3 shows a connection structure of an adaptive power phase controller according to the present invention.

FIG. 3 shows a connection structure of an adaptive power phase controller 208 according to this embodiment. As shown in FIG. 3, the adaptive power phase controller 208 used in this embodiment includes a detector 301, ADC 302, a self-interference signal power register 303, a cancellation signal power register 304, a subtracter 305, a multiplier 306, a coefficient register 307, an output signal power register 308, a subtracter 309, a step controller 310, an adder 311, an estimated minimum power register 312, and a current phase register 313.

The detector 301 serves as an input end of the adaptive power phase controller 208. An output end of the detector 301 is connected to an input end of the ADC 302, and an output end of the ADC 302 is connected to an input end of the self-interference signal power register 303, an input end of the cancellation signal power register 304, and an input end of the output signal power register 308, respectively.

An output end of the self-interference signal power register 303 and an output end of the cancellation signal power register 304 are connected to an input end of the subtracter 305. An output end of the subtracter 305 and an output end of the coefficient register 307 are connected to an input end of the multiplier 306. An output end of the multiplier 306 is connected to the feedback regulating end of the attenuator 202, to regulate power of a cancellation signal by using the attenuator 202.

An output end of the output signal power register 308 and an output end of the estimated minimum power register 312 are connected to an input end of the subtracter 309. An output end of the subtracter 309 and an output end of the current phase register 313 are connected to an input end of the step controller 310. An output end of the step controller 310 is connected to an input end of the adder 311, and an output end of the adder 311 is connected to the feedback regulating end of the phase shifter 203.

The adaptive power phase controller 208 in this embodiment can automatically complete amplitude and phase control without intervention of a processor, and the processor only needs to initialize original parameters, thereby saving processor resources. In comparison with traditional multi-tap radio frequency elimination, since there is only one tap, the convergence algorithm becomes simpler and can be implemented with simple hardware without complex processors.

During a training phase and a data transmission phase of the self-interference signal cancellation device in this embodiment, the radio frequency switches shift to different positions at different phases, so as to control signal to flow into a control module or be output directly.

A control method for the self-interference signal cancellation device is as follows:

Training phase:

When the output end a of the radio frequency switch 205, the output end b of the radio frequency switch 206, and the output end a of the radio frequency switch 207 are rendered conductive, power collection of a self-interference signal is completed;

When the output end b of the radio frequency switch 205, the output end a of the radio frequency switch 206, and the output end a of the radio frequency switch 207 are rendered conductive, power collection of a cancellation signal is completed;

Power regulation of the cancellation signal is completed by using the attenuator 202; and When the output end a of the radio frequency switch 205, the output end a of the radio frequency switch 206, and the output end b of the radio frequency switch 207 are rendered conductive, phase regulation of the cancellation signal is completed.

Data output phase:

The output end a of the radio frequency switch 205, the output end a of the radio frequency switch 206, and the output end a of the radio frequency switch 207 are rendered conductive, and a signal after the self-interference signal is eliminated is output.

It should be noted that, for the radio frequency switch 205, the radio frequency switch 206, and the radio frequency switch 207, only one of the output end a and the output end b is rendered conductive at the same time.

The radio frequency switch 205, the radio frequency switch 206, the radio frequency switch 207, and the adaptive power phase controller 208 all receive a command from a command parser at a mobile terminal, and the radio frequency switch 205, the radio frequency switch 206, the radio frequency switch 207, and the adaptive power phase controller 208 execute corresponding operations according to different commands from the command parser at the mobile terminal. By using the radio frequency switch instead of a coupler, the device has characteristics such as low attenuation and high collection precision, and efficiently resolves the problem that it is difficult to conduct detection due to too low power of a residual self-interference signal.

Figure 4:
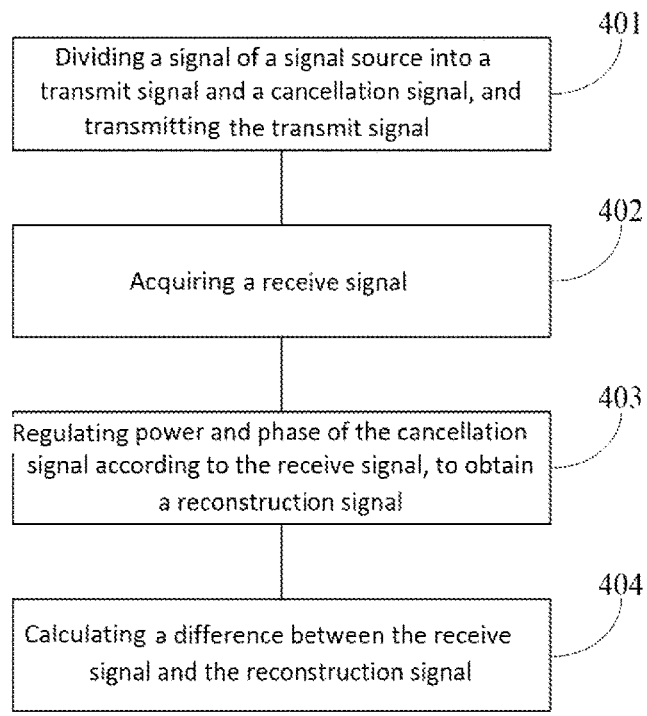
FIG. 4 is a flowchart of a self-interference signal cancellation method according to the present invention.

The present invention further provides a self-interference signal cancellation method. FIG. 4 is a flowchart of an embodiment of a self-interference signal cancellation method according to the present invention. As shown in FIG. 4, the self-interference signal cancellation method includes the following steps:

Step 401: Dividing a signal of a signal source into a transmit signal and a cancellation signal, and transmitting the transmit signal; and dividing, by a power divider, a radio-frequency signal of the signal source into two paths, where one enters a transmit antenna to be a transmit signal, and the other is used as a cancellation signal for self-interference cancellation. Since the cancellation signal and the transmit signal are identical, after amplitude and phase regulation, the cancellation signal is combined with a receive signal, and then self-interference cancellation is completed.

Step 402: Acquiring a receive signal. The receive signal herein includes a transmit signal from a mobile terminal itself and a transmit signal from another device. The purpose of the method is to eliminate interference caused by the transmit signal from the mobile terminal itself on the transmit signal from another device.

Step 403: Regulating power and phase of the cancellation signal according to the receive signal, to obtain a reconstruction signal. Specific steps involved in this step includes the following steps:

Step A1: Calculating a power difference between the receive signal and the cancellation signal;

Step A2: Regulating the cancellation signal according to the power difference to make the cancellation signal and the receive signal have the same power, to obtain a first output signal. The adaptive power phase controller 208 is responsible for collecting the powers of the cancellation signal and the receive signal, calculating a power difference between the two, and then regulating a coefficient of the attenuator according to the difference, so that the cancellation signal and the receive signal have the same power, so as to complete power control within a very short period of time.

Step A3: Calculating a power difference between the receive signal and the first output signal, to obtain output signal power;

Step A4: Calculating a difference between the output signal power and a preset value, to obtain a calculation result; and Step A5: Regulating a power control signal according to the calculation result, to make phase of the power control signal opposite to phase of the receive signal. The adaptive power phase controller 208 is responsible for collecting the output signal power, and finding optimal phase according to the power. This device can find an optimal value within 20 iterations to complete the phase control. The adaptive power phase controller 208 traverses the phase at a varying step from the 0 phase to find out a phase that outputs lowest power of a residual self-interference signal. A value is preset inside the adaptive power phase controller 208, and the value is estimated power of the output residual self-interference signal. Difference between the output signal power and the preset value is calculated, and then a phase accumulated step is controlled according to the difference. When the difference between the output signal power and the preset value is less than the set value and increases as the phase increases, the iteration ends and the phase of a last iteration is used as the optimal phase.

Step 404: Calculating a difference between the receive signal and the reconstruction signal. The combiner 204 calculates the difference between the receive signal and the reconstruction signal and outputs a signal. The output signal is a receive signal having no self-interference signal.

Each embodiment of the present specification is described in a progressive manner, each embodiment focuses on content that is different from other embodiments, and the same and similar parts between the embodiments may be refer to each other. Because the system disclosed in the embodiments is corresponding to the method disclosed in the embodiments, the description is given briefly, and for relevant parts, reference may be made to the description of the method.

Specific examples are used herein to illustrate the principle and embodiments of the present invention, and the above description of the embodiments is only used to help understand the methodology and concept of the present invention. Meanwhile, various alterations to the embodiments and applications may come to those skilled in the art according to the concept of the present invention. In conclusion, the description should not be construed as limiting the present invention.

What is claimed is:

1. A self-interference signal cancellation device, comprising:
   a transmit antenna;
   a combiner;
   a self-interference signal reconstruction circuit, an output end of which is connected to a first input end of the combiner;
   a power divider, dividing a signal source into two paths, with one being connected to the transmit antenna and the other being connected to an input end of the self-interference signal reconstruction circuit; and
   a receive antenna, an output end of which is connected to a second input end of the combiner and a feedback regulating end of the self-interference signal reconstruction circuit, respectively,
   wherein the transmit antenna and the receive antenna are arranged at different positions, and
   wherein the self-interference signal reconstruction circuit comprises:
      an adaptive power phase controller;
      a phase shifter, an output end of the phase shifter being connected to an input end of the combiner and a first input end of the adaptive power phase controller, respectively; and
      an attenuator, an input end of the attenuator being connected to the power divider, and an output end of the attenuator being connected to an input end of the phase shifter,
      wherein the output end of the receive antenna is connected to a second input end of the adaptive power phase controller, an output end of the combiner is connected to a third input end of the adaptive power phase controller, a first output end of the adaptive power phase controller is connected to a feedback regulating end of the phase shifter, and a second output end of the adaptive power phase controller is connected to a feedback regulating end of the attenuator.

2. The cancellation device according to claim 1, further comprising a first radio frequency switch, wherein an input end of the first radio frequency switch is connected to the output end of the phase shifter; a first output end of the first radio frequency switch is connected to the input end of the combiner; and a second output end of the first radio frequency switch is connected to the first input end of the adaptive power phase controller.

3. The cancellation device according to claim 1, further comprising a second radio frequency switch, wherein an input end of the second radio frequency switch is connected to the output end of the receive antenna; a first output end of the second radio frequency switch is connected to the input end of the combiner; and a second output end of the second radio frequency switch is connected to the second input end of the adaptive power phase controller.

4. The cancellation device according to claim 1, further comprising a third radio frequency switch, wherein an input end of the third radio frequency switch is connected to the output end of the combiner; a first output end of the third radio frequency switch is an output end of the cancellation device; and a second output end of the third radio frequency switch is connected to the third input end of the adaptive power phase controller.

5. The cancellation device according to claim 1, wherein a distance from a position of the transmit antenna to a position of the receive antenna is greater than 8 cm.

6. The cancellation device according to claim 5, wherein the transmit antenna and the receive antenna have different polarization modes.

7. The cancellation device according to claim 1, wherein the transmit antenna and the receive antenna have different polarization modes.

* * * * *

UNITED STATES PATENT AND TRADEMARK OFFICE
CERTIFICATE OF CORRECTION

PATENT NO. : 10,367,542 B2
APPLICATION NO. : 15/782189
DATED : July 30, 2019
INVENTOR(S) : Kan Wang et al.

It is certified that error appears in the above-identified patent and that said Letters Patent is hereby corrected as shown below:

On the Title Page

Item (71), Applicant, please change the name of the Applicant from:
"Southwest Electronics Technology Research Institute (China Electronics Technology Group Corporation, Chengdu, Sichuan (CN)"

To:
--Southwest Electronics Technology Research Institute (China Electronics Technology Group Corporation No. 10 Research Institute), Chengdu, Sichuan (CN)--

Signed and Sealed this
Tenth Day of December, 2019

Andrei Iancu
*Director of the United States Patent and Trademark Office*